United States Patent [19]
Stadler et al.

[11] Patent Number: 5,838,971
[45] Date of Patent: Nov. 17, 1998

[54] PROCESS FOR IMPLEMENTING DYNAMIC DATA TYPES IN DISTRIBUTED COMPUTING NETWORKS USING AN OSF/DCE PLATFORM

[75] Inventors: Kurt Stadler; Raimund Mödl, both of München, Germany

[73] Assignee: Siemens Aktiengesellschaft, Munich, Germany

[21] Appl. No.: 624,363

[22] PCT Filed: Sep. 22, 1994

[86] PCT No.: PCT/DE94/01105

§ 371 Date: Mar. 28, 1996

§ 102(e) Date: Mar. 28, 1996

[87] PCT Pub. No.: WO95/09503

PCT Pub. Date: Apr. 6, 1995

[30] Foreign Application Priority Data

Sep. 29, 1993 [DE] Germany ............... 43 33 166.1

[51] Int. Cl.$^6$ ...................................... G06F 9/40
[52] U.S. Cl. ........................................... 395/684
[58] Field of Search .................... 395/684, 680

[56] References Cited

U.S. PATENT DOCUMENTS 5,421,016  5/1995  Conner et al. ............... 395/707
5,452,459  9/1995  Drury et al. ................... 707/3
5,497,463  3/1996  Stein et al. ............... 395/200.33

OTHER PUBLICATIONS

IEEE Transactions on Software Engineering, Sep., 1981, "Why Programming Environments Need Dynamic Data Types", J. Goodwinl, pp. 451–457.

Prentice–Hall, 1992, "Modern Operating Systems", A. Tanenbaum, pp. 417–426.

"Advanced C++ Programming Styles and Idioms", J.O. Coplien, pp. 276–306.

*Primary Examiner*—Alvin Oberley
*Assistant Examiner*—St. John Courtenay, III
*Attorney, Agent, or Firm*—Hill & Simpson

[57] ABSTRACT

In order to use dynamic data types in user programs when transmitting information over a computer network using the OSF distributed computing environment, where dynamic data types are not provided for, the control instruction "transmit_as" or "represent_as" provided in DCE is added as an attribute to the data type defined by the user. When the control instruction is compiled, a call to a conversion program is thus inserted into the interface procedure (stub). Every time the dynamic data type occurs in the user program, the conversion program is called by means of the interface procedure, the dynamic data type is converted there into a defined data type available in program execution and capable of being processed by the interface, and is then transmitted via the interface to the network.

6 Claims, 1 Drawing Sheet

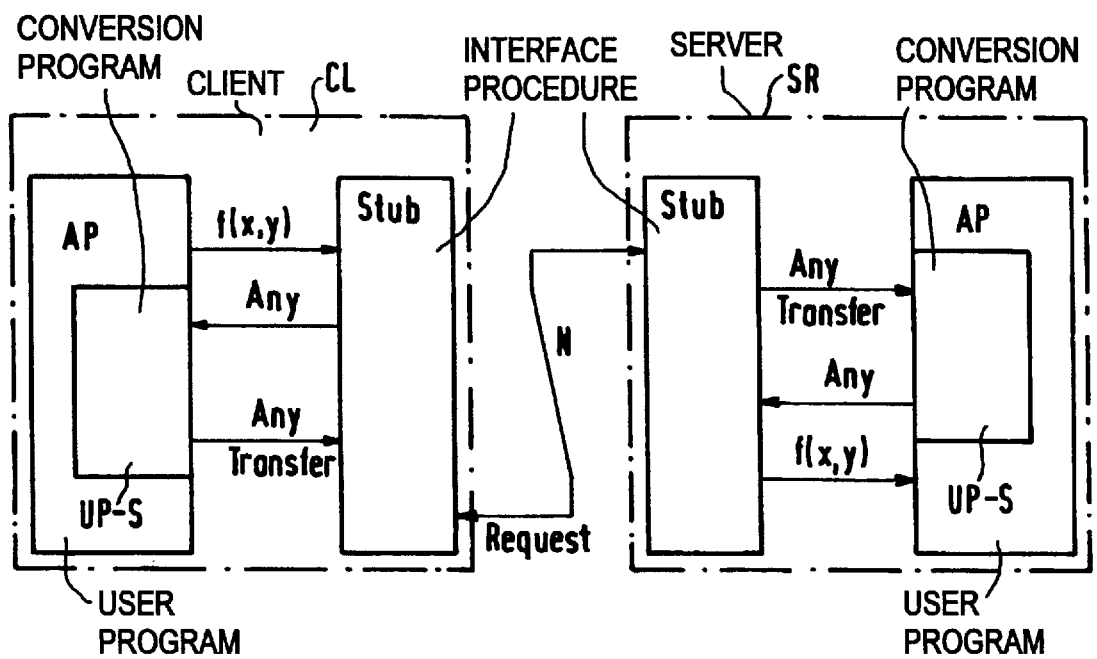

PROCESS FOR IMPLEMENTING DYNAMIC DATA TYPES IN DISTRIBUTED COMPUTING NETWORKS USING AN OSF/DCE PLATFORM

BACKGROUND OF THE INVENTION

1. Field of the Invention

Computers, for example personal computers and workstations, are increasingly becoming networked with one another. Accordingly, a computer connected to such a network can work together with a large number of other computers and exchange programs. For satisfactory information exchange between a plurality of computers, it is necessary for the interface between the computer and the network to be uniquely defined. However, the use of computers in computer networks is also accompanied by problems, which exist in particular whenever computers of different architectures which operate with different operating systems are used. If in such a case a computer of a first architecture wishes to access a computer of a second architecture and wishes to send information to the latter or read information from the latter, it must be ensured that the information transmitted via the network is such that it can be used by the computers. In the following, the computer which wants writing or reading access to another computer is referred to as the client, while the computer which is to be accessed is referred to as the server.

2. Description of the Related Art

The access of the client to the server is referred to as a remote procedure call or in, abbreviated form, RPC. The problems which occur in the case of such RPCs are described, for example, in Tananbaum, "Modern Operating Systems", Printice-Hall 1992, section 10.3 pages 417 to 426.

The problems which occur in the case of such distributed computing systems with computers of different operating systems must be solved such that they remain hidden from the user programmers. This means that the interfaces have to be simple, clearly organized and standard. A system software which makes this possible is DCE (distributed computing environment) from OSF (Open Software Foundation). A review of this system software can be found in GUUG-Nachrichten 23/24 (1991) pages 30 to 39. There it is also described how in DCE the remote procedure call is carried out. For details, reference is made to the official DCE documentation from OSF.

At present, in DCE the interface definition is statically defined. The interface is described by a special language IDL (interface definition language), which is subsequently translated by a compiler into the interface procedure. The interface procedure is known as a stub; it is a procedure which on the client side transforms the information transmitted via the network into a network-internal normal form and packs it together with address and sender details. On the server side, there is a corresponding interface procedure or server stub, which transforms the data information transmitted via the network into the data format which is used at the server. In the following, these interface procedures are referred to by the term stub.

Since the interface and the data types to be transmitted via the interface are statically defined in DCE, they must always be fully defined in the design phase of a user program or an interface. This means that the interface cannot be altered at the time of execution of a user program. Expressed another way, it is not possible to write user programs with dynamic data types whose type is defined only at the time of program execution.

BRIEF DESCRIPTION OF THE DRAWINGS

The FIGURE is a schematic illustration of a client and server circuit for performing the methods of the present invention.

DETAILED DESCRIPTION OF THE PREFERRED EMBODIMENTS

SUMMARY OF THE INVENTION

An object on which the invention is based is to utilize the possibilities provided by DCE (distributed computing environment) such that there can also be included in the user programs dynamic data types which can be processed by the stubs authorized in DCE without amendments by DCE. This and other objects and advantages of the invention are achieved according to the present invention by a process for implementing dynamic data types in distributed computing networks using an OSF/DCE platform, in which each dynamic data type is defined by the user, in which the IDL control instruction transmit_as is added on to the definition of the dynamic data type as an attribute, so that after its compilation into an interface procedure (or stub) a call to a conversion program is inserted into the stub, in which, whenever a dynamic type occurs in the user program on the client side, the stub calls the conversion program, which converts the dynamic data type into a defined data type available in program execution and capable of being processed by the stub and is passed on to the stub for further processing.

The invention also provides a process for using dynamic data types in distributed computing networks using an OSF/DCE platform, in which each dynamic data type is defined by the user, in which the ACF control instruction represent_as is added on to the definition of the transfer type as an attribute, so that after its compilation into an interface procedure (also known as a stub) a call to a conversion program is inserted into the stub, in which, whenever a dynamic type occurs in the user program on the client side, the stub calls the conversion program, which converts the dynamic data type into a defined data type available in program execution and capable of being processed by the stub and is passed on to the stub for further processing.

At the time of compiling the interface, which is described in IDL interface definition language , into the stub, the dynamic data type is still not defined. The data type applicable in a particular instance can only be determined in program execution. To permit the processing of such data types by the stubs, use of the control instructions transmit_as and represent_as is organized in such a way that, if a dynamic data type occurs in the user program, a conversion program in the client or server is called, which program converts the dynamic data type at the time of the user program execution, that is to say when the dynamic data type is being processed in the user program, into a transfer data type and feeds the latter to the stub. The transfer data type is known in the stub, is statically defined and can be processed by the stub. The stub of the client can consequently convert the information of the transfer data type in the customary way such that its transmission via the network is customary. A corresponding situation also takes place in the case of the server. There, the information transmitted via the network is fed to the server stub, which can interpret the information of the transfer data type, but recognizes that a dynamic data type is concerned here and accordingly calls the corresponding conversion program in the server, which converts the transfer data type into the dynamic data type, which is then processed by the server. This procedure can be carried out both in the case of a write access and in the case of a read access.

The invention is further explained with reference to an exemplary embodiment. A schematic circuit diagram according to the figure is used for the explanation.

Represented schematically in the figure is the client CL, for example a computer, and a server SR, which may likewise be a computer. Both in the case of the client CL and in the case of the server SR there are user programs AP and, for the interface, the so-called interface procedures, which are referred to by the term stub. The stubs define the interface of the client or server or network N. The stubs ensure that the information to be transmitted via the network N has such a form that this transmission is possible. For this purpose, the stubs must be familiar with the data types used. Their definition can be carried out using the IDL language, which is translated into the stubs before execution of the user program AP. This defines the interface, that is to say the stubs. If the type of an interface element is not yet known at the time of compilation, but only at the time of program execution of the user program AP, it is also not possible to define the interface before program execution. The invention thus indicates the way in which it is possible to proceed in order to define the data types only once program execution is in progress. Such data types are known as dynamic data types. The dynamic data types serve as space savers, which signal to the system that the data type applicable in a particular instance is being defined once program execution is in progress. In the following, such a dynamic data type is referred to by the name "Any". The encoding of a read access or a write access using a dynamic data type is represented below:

```
interface FileService {
    fread ( /* Read operation                              */
    |    [in] FileRef file, /* file reference              */
    |    [in] Any    data /* User data (dynamic data type) */
    | );

I
    fwrite (/* Write operation                             */
        [in]  FileRef file, /* file reference              */
        [out] Any data    /* User data(dynamic data type)  */
    );
}
```

Here, the access is to a database; consequently, the name of the database is specified and the data type. Since the datatype is dynamic, Any is correspondingly inserted as the type designation.

Dynamic data types thus have two components; they include a unique identification of the applicable data type and the applicable data field. The applicable data field is dependent on the architecture of the client or server. If the dynamic data type is transmitted via the network, to be precise between different architectures, the representation of the data field must be converted.

This cannot take place in the stub, since only types defined before program execution can be processed there. A conversion program UP is required for this purpose, which may, for example, be part of the user program. The stub must, however, be signalled that a data type is a dynamic data type and what it has to do if such a dynamic data type is to be processed during execution of the user program AP. This is so since, in this case, the stub must call the conversion program UP. DCE provides two possibilities here. A first possibility is the use of the control instruction transmit_ as, the second possibility the use of the control instruction represent_as.

Both control instructions are attributes which are added to the type definitions. These control instructions have the effect in the translation of the interface definition into the stub that calls are inserted there which call the corresponding conversion program, in particular whenever such a data type is to be processed.

In the case of the exemplary embodiment, a dynamic data type is always defined by two components, which in a general form of representation look as follows:

```
typedef struct {    /* ANSI C                                */
    Typecode type; /* TYPE identification                    */
    void    *value /* Pointer to memory image
} Any Type;
```

The first component is the identification of the applicable data type, which corresponds to the dynamic data type Any. The second component may include a pointer, which points to the applicable data field in a memory. A brief notation is given in the following line.

typedef AnyType *Any;

This dynamic data type "Any" is then converted by the conversion program UP-C into an applicable data type, which looks as follows:

```
typedef struct {                //DCE-IDL
    Typecode  tc;               //Type identification
    long      1;                //Length of encoded byte string
    [size_is(1)] byte value[ ]; //Encoded value
} AnyTransfer;
```

The data type produced by the conversion program UP-C is referred to as an "Any" Transfer and is a data type with which the stub is familiar and which can be processed by the latter in a known way. This transfer type includes in turn a data type identification, referred to as TC, and a data field in encoded form. This data structure is fed to the stub, which processes it in a customary way into the transfer form such that transmission via the network is possible.

In the transfer form, the length of the data field to be transmitted is specified, and for example the byte values. The conversion program UP-C is designed in such a way that it encodes the data values such that they can be transmitted via the network N and can be decoded on the receiver side.

The conditions just described on the client side also exist in a corresponding way on the server side. Here, the server stub produces the transfer version Any Transfer, which is then fed to the conversion program UP-S. The conversion program UP-S produces the applicable data type according to the type identification and produces the data field by decoding. Finally, the dynamic data type is produced, which is fed to the stub and passes from there to the user program.

In order to set up the stubs in such a way that they call the assigned conversion program whenever dynamic data types occur in the user program, the IDL language is again used. For this purpose, two control instructions of the IDL language may be used. Both use attributes by means of which, after translation, the stubs are made to call the corresponding conversion program.

The first control instruction is "transmit_as". This control instruction is inserted into the data type definition as follows:

```
typedef [transmit_as(AnyTransfer)] struct {    //DCE-IDL
    Typecode tc;              // Type identification
    [ptr] byte *value;        // pointer to value memory image
} AnyType;
```

The instruction transmit_as (Any Transfer) causes the IDL compiler to insert the following attributes into the stub code whenever a dynamic data type "Any Type" is processed:

Call of the assigned conversion program, which call encodes the data field of the data type before the packing by the stub takes place. This applies to the client side. The stub expects that the conversion program will convert the dynamic data type Any into the transfer type Any Transfer, which can be processed by the stubs.

The same applies correspondingly to the server side. Here, the stub calls the conversion program after the transfer type has been received and processed in the customary way, in order to decode the transmitted version, that is to say it converts the Any-Transfer type into the dynamic type Any. This dynamic data type is then fed again to the stubs.

The second possibility is the use of represent_as as the control instruction. The attribute used in this case requires a separate file, the ACF file. This file is known here as Test ACF (ACF =attribute configuration file). Test is a space saver for a name which is defined by the user. The control instruction then looks as follows:

```
/*File: TEST.ACF*/                                    VII
    interface test {
        typedef [represent_as (AnyType)] Anytransfer;
    }
```

The structure of Any Type has already been shown above. The definition of Any Transfer and Any, which is inserted by the user into the IDL definition, is as follows:

```
typefed struct {                    // DCE-IDL
    Typecode tc;                    // Type identification
    long 1;                         // length of encoded image
    [size_is (1)] byte value;       // encoded memory image
} AnyTransfer                                         VIII
``` typedef AnyTransfer *Any; // Any is pointer to Anytype

If a dynamic data type Any is being processed, the IDL compiler interprets the ACF file and inserts calls to the assigned conversion programs into the stubs in a similar way to that which has been described in the case of transmit_as. The ACF file in this case signals to the IDL compiler that the Any data type must be converted into ANY transfer (transfer type) by the conversion program.

The procedure is explained once again with reference to the figure. In this explanation it is assumed that the stubs have received for the dynamic data types used by the user the corresponding data calls to the conversion program UP by means of the control instructions transmit$_{13}$ as or represent$_{13}$ as. If, at the time of execution of the user program AP, a dynamic data type occurs, for example the function F (x, y . . . ) is to be executed, x being a dynamic data type, the stub interprets this dynamic variable as "Any" and calls the assigned conversion program UP-C. The conversion program thus receives Any Type, that is to say the data type description and the pointer to a data field in a memory. From this information, the conversion program UP-C produces a byte stream, which contains the data values in encoded form. This format is independent of any architecture and can consequently by transmitted via the network unmodified. This Any-Transfer format is then processed by the stub such that a transmission via the network N is possible.

On the server side SR, the stub again produces the Any-Transfer version of the transmitted information and passes it to the conversion program UP-S. This AnyTransfer version includes the data type identification and the byte stream which has been transmitted. The latter still has the encoded form and is then decoded into the local representation. The data type description is thereby obtained and the data field is stored into an assigned buffer memory.

Although other modifications and changes may be suggested by those skilled in the art, it is the intention of the inventors to embody within the patent warranted hereon all changes and modifications as reasonably and properly come within the scope of their contribution to the art.

We claim:

1. A method for implementing dynamic data types in distributed computing networks using an OSF/DCE platform, comprising the steps of:

defining each dynamic data type by a user program, adding an IDL control instruction transmit_as on to a definition of the dynamic data type as an attribute so that after compilation of the dynamic data type into an interface procedure a call to a conversion program is inserted into the interface procedure, converting the dynamic data type into a defined data type available in program execution and capable of being processed by the stub whenever a dynamic type occurs in the user program on a client side by the interface procedure calling the conversion program, and passing the defined data type on to the interface procedure for further processing.

2. A method as claimed in claim 1, further comprising the steps of:

producing an applicable data type by the conversion program from a data-type identification which defines the dynamic data type and a pointer to a stored data field in program execution, and producing a data field to be transmitted in coding suitable for transmission.

3. A method as claimed in claim 1, further comprising the step of:

producing the interface procedure on the server side by a control instruction selected from the group consisting of transmit_as and represent_as which produces the dynamic data type from the transmitted message with aid of the conversion program.

4. A method for using dynamic data types in distributed computing networks using an OSF/DCE platform, comprising the steps of:

defining each dynamic data type by a user program, adding ACF control instruction represent_as on to a_definition of a transfer type as an attribute so that after compilation of the transfer type into an interface procedure a call to a conversion program is inserted into the interface procedure, calling the conversion program by the interface procedure whenever a dynamic type occurs in the user program on a client side which converts the dynamic data type into a defined data type available in program execution and capable of being processed by the interface procedure, and passing the dynamic data type on to the interface procedure for further processing the conversion program.

5. A method as claimed in claim 4, further comprising the steps of:

producing an applicable data type defining the dynamic data type by the conversion program from a data-type identification and a pointer to a stored data field in program execution, and producing the data field to be transmitted in coding suitable for transmission.

6. A method as claimed in claim 4, further comprising the step of:

producing the interface procedure on the sewer side by a control instruction selected from the group consisting of transmit_as and represent as which produces the dynamic data type from the transmitted message with the aid of a conversion program.

* * * * *